United States Patent

[11] 3,599,817

| [72] | Inventor | Dale L. Bargman, Jr.<br>Broomfield, Colo. |
|---|---|---|
| [21] | Appl. No. | 833,391 |
| [22] | Filed | June 16, 1969 |
| [45] | Patented | Aug. 17, 1971 |
| [73] | Assignee | Colorado Leisure Products, Inc.<br>Broomfield, Colo. |

[54] APPARATUS FOR LOADING AND UNLOADING CAMPER BODIES
14 Claims, 11 Drawing Figs.

[52] U.S. Cl. .................................................. 214/515, 254/45
[51] Int. Cl. .................................................. B60p 1/64
[50] Field of Search .......................................... 214/515, 38.8; 254/124, 126, 45, 86, 86 H, 2; 187/8.72

[56] References Cited
UNITED STATES PATENTS

| 2,206,788 | 7/1940 | Meacham .................... | 254/126 |
| 2,922,533 | 1/1960 | La Barge, Jr. ................. | 187/8.72 |
| 3,051,340 | 8/1962 | Ely ............................... | 214/512 |
| 3,202,304 | 8/1965 | Lannen ........................ | 214/515 X |
| 3,243,161 | 3/1966 | Green .......................... | 254/45 |

FOREIGN PATENTS

| 756,247 | 9/1933 | France ........................ | 187/8.72 |
| 1,181,988 | 1/1959 | France ........................ | 214/515 |
| 1,198,687 | 8/1965 | Germany ..................... | 214/515 |

*Primary Examiner*—Albert J. Makay
*Attorney*—John E. Reilly

ABSTRACT: Parallelogram linkage assemblies are releasably attachable to opposite sides of a camper body and the like, a drive mechanism being selectively activated to advance the linkage between a position supporting the camper in a raised position for placement on the bed of a platform, such as, the flatbed of a vehicle and a lowered position at rest on the ground. In one lowered position of the camper, supporting wheels are engageable with the ground surface to facilitate movement of the camper from place to place.

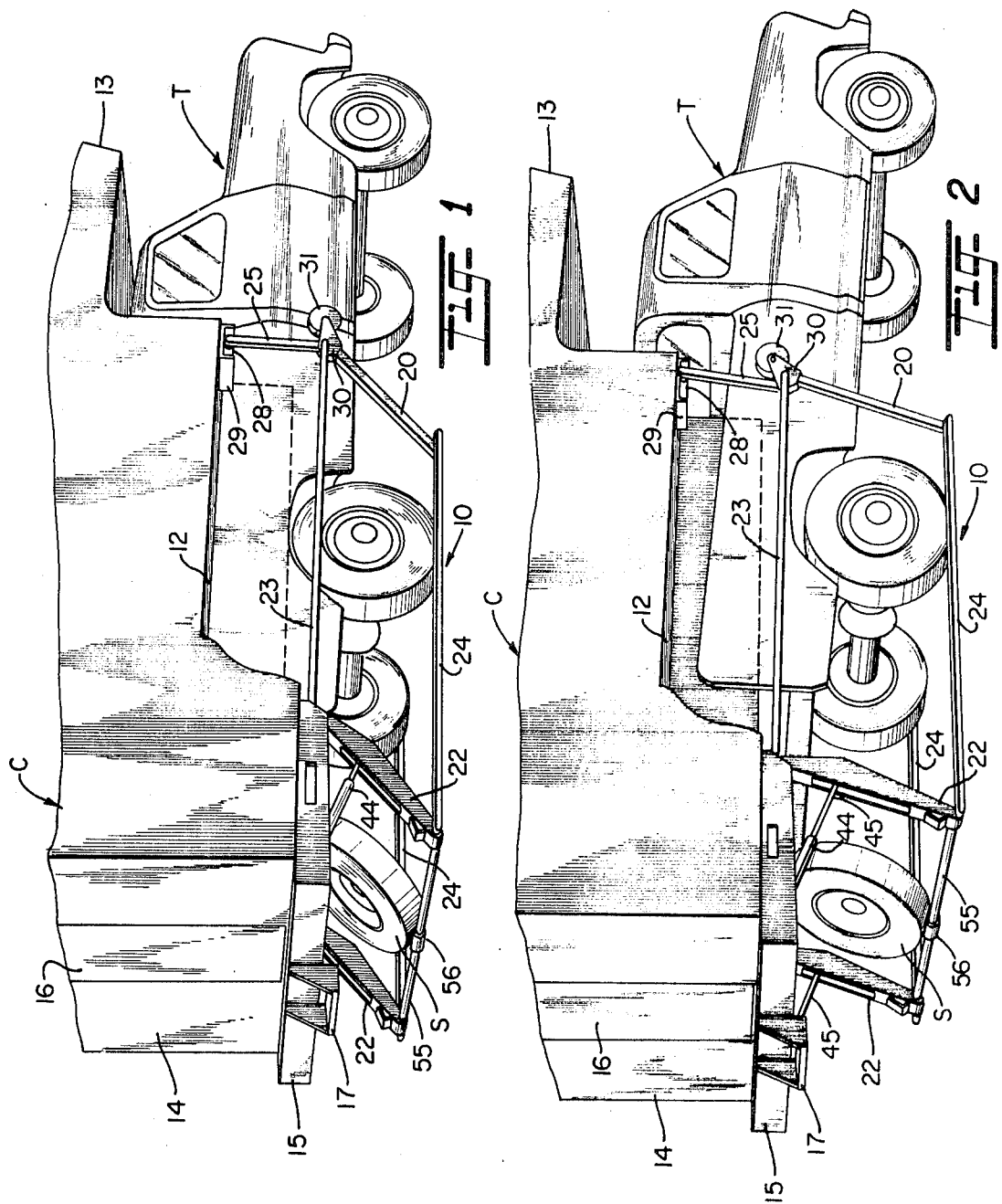

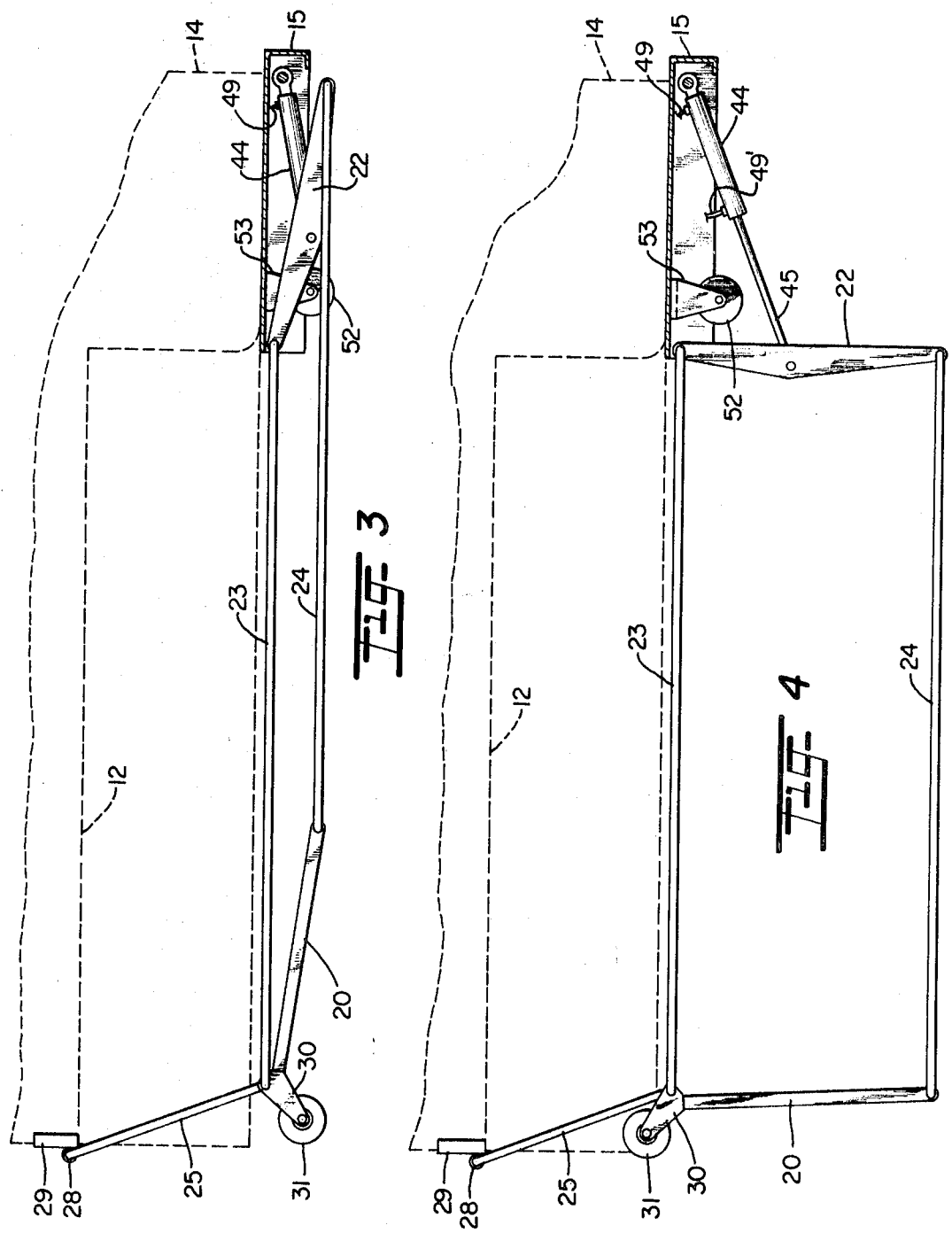

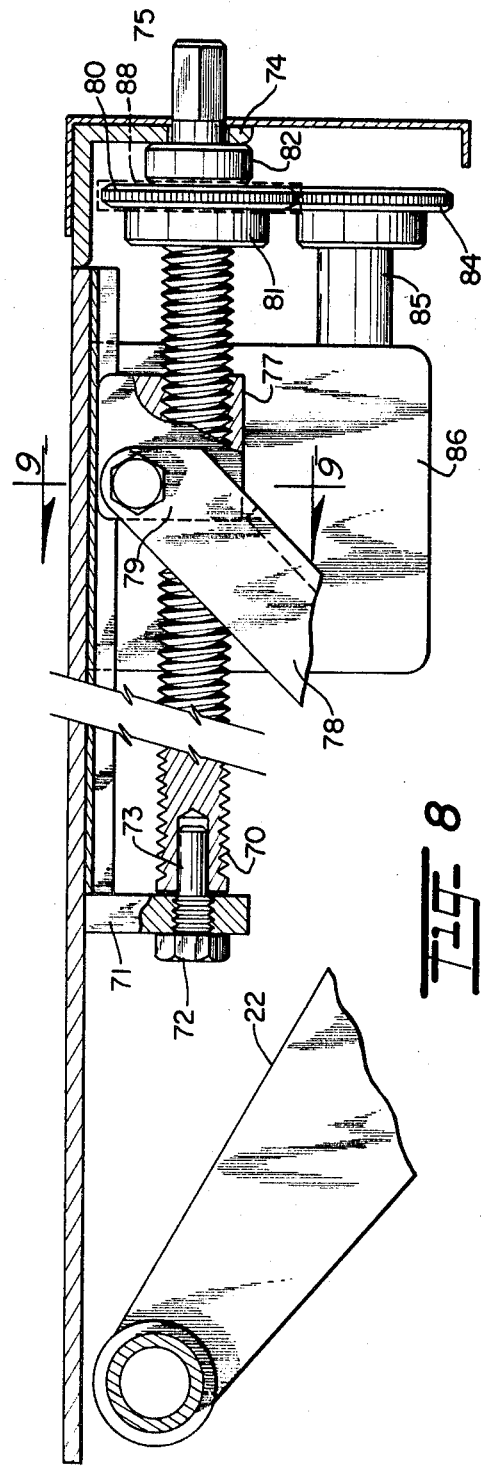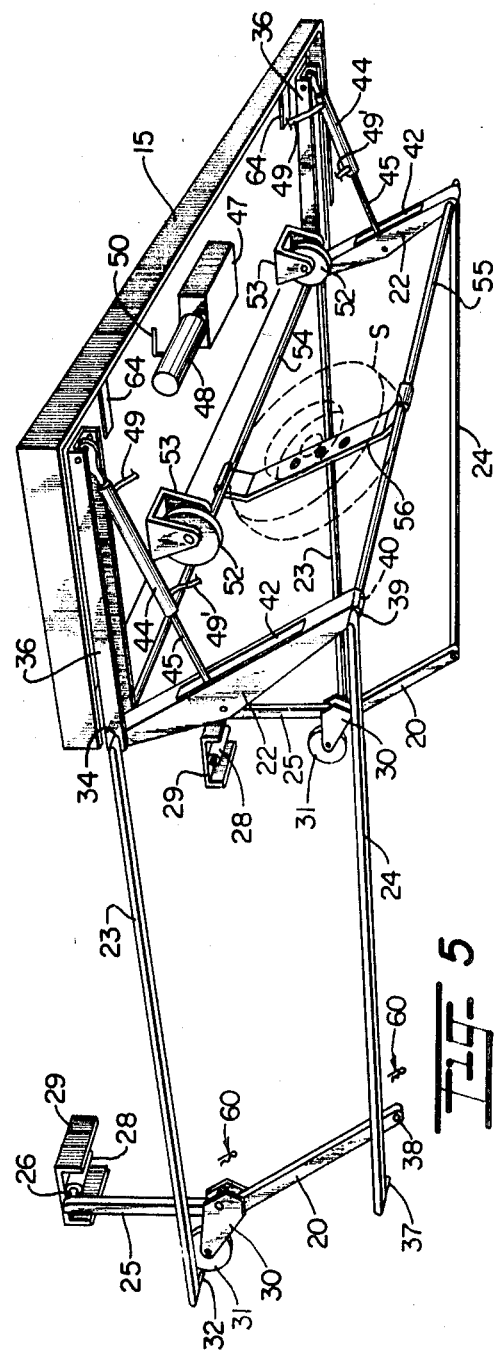

INVENTOR.
DALE L. BARGMAN, JR.
BY
John E. Reilly
ATTORNEY

APPARATUS FOR LOADING AND UNLOADING CAMPER BODIES

This invention relates to novel and improved lifting devices, and more particularly relates to apparatus controllable by an operator to uniformly lift and lower heavy, bulky loads, such as, a camper body, for placement upon or removal from a raised platform, such as for instance, a vehicle.

Various means have been devised to lift and lower camper bodies for placement on the flatbed of a truck. Characteristic of such lifting devices are lift jacks stationed at spaced intervals around the sides of the camper body and which can be successively lifted or lowered between the ground surface and the elevated height necessary for placement on the vehicle. Linkage type mechanisms have also been devised but customarily require special attachment to the vehicle or platform upon which the load is to be placed. Lifting devices of the type described have proven to be relatively unwieldy and not always dependable in supporting the camper body in the raised position at least independently of the vehicle itself; or, in the lowered position afford no means for ease of movement of the camper body from one position to another. Also, the camper body ordinarily must be slanted or tilted in advancement between the raised and lowered positions, and in general poses a tedious and time-consuming task for one person. Furthermore, in many cases, particularly under high-wind conditions, lifting devices fail to provide the necessary rigidity and support for the vehicle in the raised position.

It is therefore an object of the present invention to provide for a novel and improved lifting device which is made up of a minimum number of parts and is releasably attachable to a relatively large, bulky load for uniformly lifting and lowering the load between a raised and lowered position.

It is another object of the present invention to provide a compact, lightweight and relatively simple apparatus attachable to opposite sides of a camper body and which can be operated by a single person for lifting and lowering the body between a ground supported position and a raised position for placement on the bed of a vehicle without the use of special jacks or other auxiliary lifting devices.

It is a further object of the present invention to provide for a safe, dependable lifting apparatus for camper bodies and the like to facilitate lifting and supporting of the camper body for placement on a truck bed and further permits removal and return to either one of two lowered positions on the ground, and in one of the lowered positions providing ground support wheels to permit movement of the camper body from place to place.

It is still a further object of the present invention to provide for a novel and improved lift apparatus provided with parallelogram linkage assemblies releasably attached to opposite sides of the camper body and engageable by a common lift mechanism on the body to effect loading and unloading of the camper body to and from a vehicle in a quick, reliable manner; and specifically wherein the drive mechanism may either be mechanically or hydraulically actuated to synchronously advance both linkage assembles between the raised and lowered positions.

It is an additional object of the present invention to provide for a compact supporting and lifting apparatus for a camper unit which can be readily attached to, or detached from, the camper for disassembly and storage within the camper or can be left in the assemblied position on the camper and may include either a storage compartment or spare tire carrier incorporated as a part of the device.

In accordance with the present invention, a preferred form thereof includes linkage assemblies secured to opposite sides of a camper body, each assembly having front and rear leg members including upper ends pivotally connected to opposite lower side portions of the camper laterally beyond the undersurface of the camper which rests on a vehicle bed. The front and rear leg members on either side are pivotally connected to one another and the rear legs are most desirably rigidly connected together so as to work in unison in lifting and lowering the load. Depending upon the type of camper, the front legs may have vertical extensions for connection to a raised portion of the camper unit. A hydraulic drive mechanism may be mounted on the camper unit adjacent the rear legs with a hydraulic cylinder for at least one of the rear legs which when energized will effect movement of the rear leg members and associated linkage assemblies simultaneously between a substantially horizontal, retracted position in which the load is relatively near the ground surface and a substantially vertical, extended position in which the load is in a raised position spaced above the ground surface and at a level to permit placement of the load on the bed of a vehicle. Supporting wheels are associated with the linkage assemblies so that in one lowered position of the camper the wheels will support the camper on the ground to facilitate rolling movement of the camper to a desired location; or in another lowered position the wheels are retracted and the camper solidly supported by the linkage frame on the ground so as not to be readily movable. Most desirably the linkage assembly is so connected to the camper unit as to permit ready attachment to release, and the assembly can be disassembled into a number of parts to facilitate storage in a compact space within the camper unit, or the assembly may be left in the assembled position on the camper and include a mounting bracket and frame associated with the rear leg members which may serve as a support for a spare tire.

In an alternate form, a mechanical drive mechanism may be utilized in place of the hydraulic system and consists of a drive shaft and follower arm which can be selectively operated by a single person to advance the linkage assemblies between the lowered and raised positions as described.

The above and other objects, advantages and features of the present invention will become more readily understood and appreciated from a consideration of the following preferred and alternate forms of the present invention, when taken together with the accompanying drawings, in which:

FIG. 1 is a perspective view of a vehicle and camper and illustrating the mounting of a preferred form of lift apparatus on the camper unit in accordance with the present invention.

FIG. 2 is a perspective view of a vehicle and camper unit as shown in FIG. 1 with the lift apparatus in the vertical extended position independently supporting the camper unit either for placement on or removal from the vehicle bed.

FIG. 3 is a side elevational view of the preferred lift apparatus in a lowered, horizontal retracted position.

FIG. 4 is an elevational view showing the preferred list apparatus in the extended substantially vertical lift position.

FIG. 5 is a perspective view of the preferred form of lift apparatus when viewed from the underside of the camper unit.

FIG. 8 is an enlarged view of the elements of the drive mechanism shown in the alternate form of FIG. 7.

Figure 10:
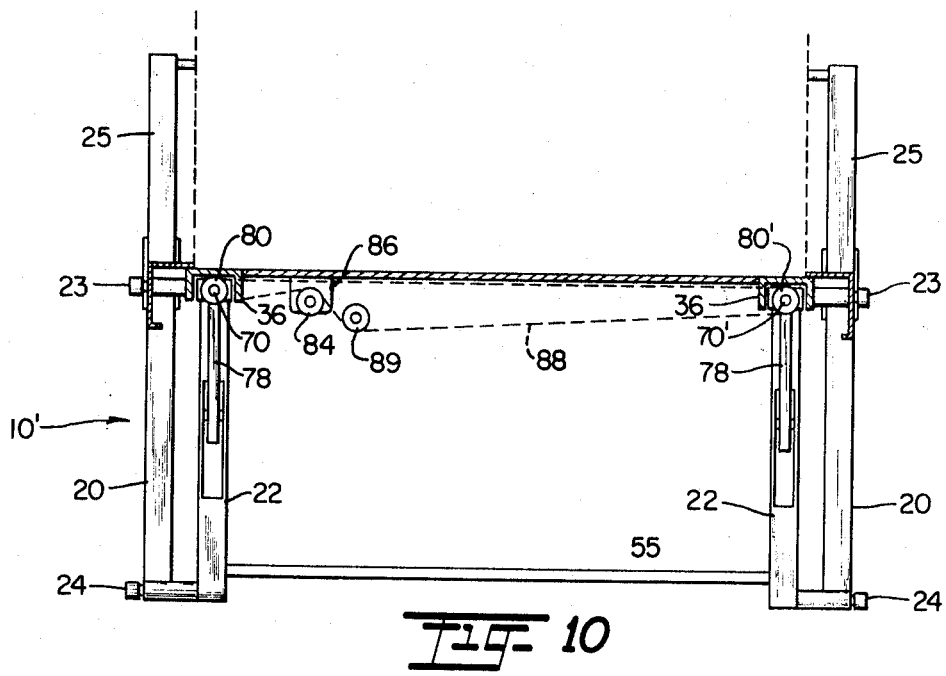
FIG. 10 is a rear elevation view with parts broken away and partially in section of the alternate form of drive mechanism.
Figures 9, 11:
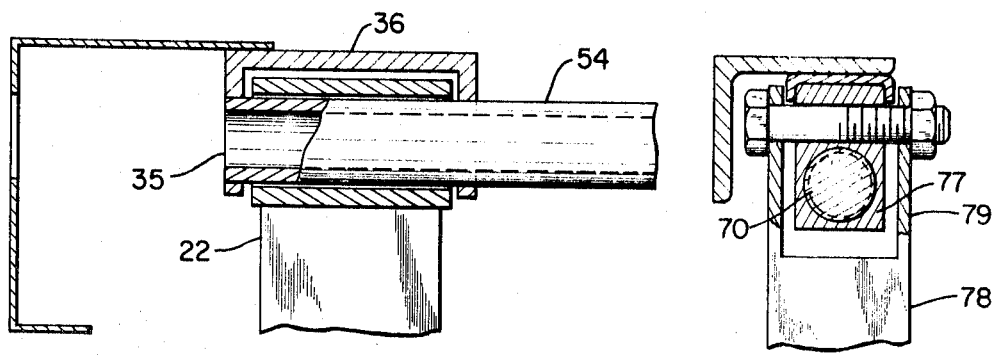
FIG. 9 is a sectional view taken about lines 9–9 of FIG. 8.
FIG. 11 is an enlarged view, partially in section, of the cross tube mounting which forms a part of the alternate form of drive mechanism.

Referring in more detail to the drawings, there is shown in FIGS. 1 to 6 a preferred form of lift apparatus which has for its intended purpose and function the controlled lifting and lowering of a camper unit C between a ground supported position and a raised position at rest on the bed of a pickup truck T, the latter being illustrated in FIG. 1. Broadly, the lift apparatus 10 is characterized in that it is capable of supporting a camper unit either in the raised or lowered ground-supported position wholly independently of the truck and is further capable of lifting the camper unit a sufficient distance to permit the truck to be backed under the camper unit, as shown in FIG. 2, and thereafter to lower the camper into position on the truck bed, again as illustrated in FIG. 1. Another feature of the lift apparatus of the present invention is that it can be selectively activated to lift the camper unit from the position at rest shown in FIG. 1 to the maximum lift position shown in FIG. 2 in order to permit the truck to be driven out from beneath the camper; and the lift apparatus can be lowered into either of two substantially horizontal, retracted positions, as shown dotted and in full in FIG. 3. In the full line position of FIG. 3, the camper unit is shown to rest on ground support wheels so that the camper can be easily maneuvered along the ground to a desired location or position; or in the dotted line position shown in FIG. 3 the camper is supported off of the ground wheels against accidental shifting or movement.

As illustrated in FIGS. 1 to 4, the camper unit C is of a type which is wider and longer than the bed of the truck T and has raised lateral wing surfaces 12 which overhang the sides of the truck, a front raised portion 13 situated over the cab of the truck, and a rear section 14 which extends beyond the bed surface of the truck and typically includes a skirt or bumper frame 15 and an entrance door 16. In general, the bumper frame 15 forms a rearward continuation of the lower edge of the truck body and may be provided with a step 17 directly beneath the entrance door 16. The camper unit as described is merely representative of commercially available campers and it is to be understood that the present invention is readily conformable for use with different types of campers, for example, those of the type in which the rearward section 14 is absent and the lateral wings 12 would extend the entire length of the camper body, except for the front raised portion 13.

In the preferred form of lift apparatus 10, a pair of identical linkage assemblies are releasably attached to opposite sides of the camper unit C, the linkage assemblies being synchronously operated by a hydraulic drive mechanism to be described. As the linkage assemblies are identical it will suffice to describe in detail the linkage assembly on one side only of the camper unit. Specifically it will be noted that the linkage assembly is made up of a parallelogram linkage having a front pivotal leg member 20, a rear pivotal leg member 22 and upper and lower spaced, horizontal linkage rods or tie bars 23 and 24, together with a front, vertical extension arm assembly 25. The arm 25 has a pivot pin 26 at its upper end which is inserted in socket 28 in a bracket 29 on the lateral wing of the camper. The front leg 20 in turn has a triangular wheel support bracket 30 for a front wheel 31, and the bracket 30 is pivotally connected to the lower end of the arm 25 by a pivot pin 32 at the front end of the upper linkage rod 23 so that the front leg member 20 is pivotal both with respect to the arm 25 and the linkage rod 23. A pivot pin 34 at the opposite end of the linkage rod 23 is releasably inserted in transverse openings formed in the front end of the channel bracket 36 and through a transverse socket 35 provided at the upper end of the rear pivotal leg 22. The lower linkage rod 24 has a pivot pin 37 at the front end which is inserted in a socket 38 at the lower end of the front leg 20, and a pivot pin 39 at its rear end is inserted in a socket 40 at the lower end of the rear leg 22. In this way, the linkage rods 23 and 24 are pivotally interconnected to upper and lower ends of the front and rear legs 20 and 22 and will freely transmit pivotal movement of the rear leg to the front leg so that both legs will move in unison.

The rear leg 22 preferably serves as the power leg for the linkage assembly and accordingly is comprised of a relatively thick channel beam section tapering outwardly toward the upper and lower ends from a relatively wide midsection and is provided with a slot 42 along one side. In the preferred form, a hydraulic drive mechanism includes a double-acting hydraulic cylinder assembly for each power leg, and here the cylinder assembly includes a cylinder portion 44 pivotally connected to the rear end of the bracket 36 and with a cylinder rod 45 extending forwardly from the opposite end of the cylinder portion 44 for insertion through the slot 42 into pivotal connection with the midsection of the power leg. A suitable reservoir and pump with motor drive, providing a source of hydraulic fluid under pressure, represented at 47, and a flow control valve of the four-way, open center type, represented at 48, are secured beneath the rear section 14 of the camper unit with pressure and return lines 49 and 49' directed to each of the cylinder assemblies. The valve is provided with a control handle 50 to regulate its opening and closing whereby to effect synchronous movement of the rear power legs between the horizontal retracted positions shown in FIG. 3 and the substantially vertical extended position shown in FIG. 4.

Again, in order to lend added mobility to the camper unit in the ground-supported position, rear support wheels 52 are mounted on castor wheel brackets 53 which in a conventional manner have a swivel connection into the underside of the rear portion of the camper unit. The rear support wheels 52 are horizontally aligned with the front wheels when the linkage assembly is in the retracted position, as shown in full in FIG. 3, so that the camper unit can be rolled to a desired location. Moreover, in order to lend additional rigidity and strength to the lift apparatus, the linkage assemblies may be interconnected by transverse connecting rods 54 and 55 extending between upper and lower ends of the rear power legs 22. The transverse connecting rods 54 and 55 can also serve as a means of mounting a spare tire carrier bracket 56 for a spare tire represented at S beneath the rear section 14, as illustrated in FIGS. 1 and 2.

Figures 6, 7:
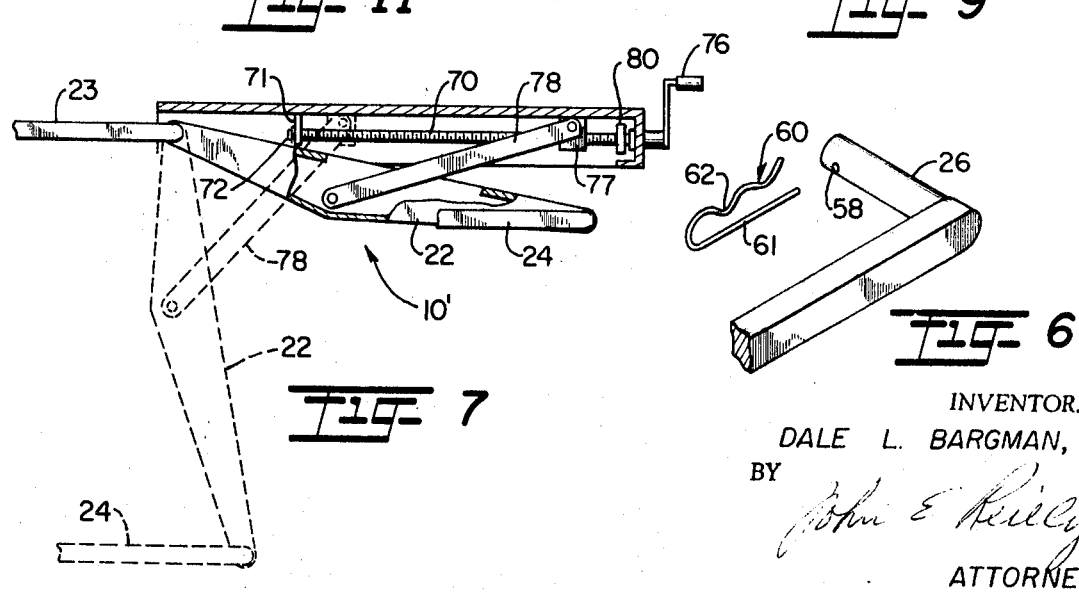
FIG. 6 is a detailed fragmentary view illustrating the releasable connection of certain of the linkage elements.
FIG. 7 is a detailed elevational view, partially in section, of a form of drive mechanism for the lift apparatus of the present invention.

Each linkage assembly is preferably constructed for quick-releasable attachment to the camper unit and, as best seen from FIG. 6, the pivot pins at the ends of the linkage rods 23 and 24 as well as the upper support arm 25 are designed for releasable but secure attachment and pivotal mounting within their respective sockets. For example, as shown in FIG. 6, the pivot pin 26 at the upper end of the support arm 25 is provided with a transverse opening 58 at the free end of the pin which projects through and beyond the socket portion for insertion of a spring wire clip member 60. The clip 60 has a straight portion 61 inserted through the hole and a corrugated portion 62 which yieldingly but firmly engages the external surface of the pin to retain the clip securely in place on the end of the pin and prevent its accidental release from the opening 58. In order to disengage the linkage assembly it is merely necessary to remove the clips 60 from the ends of the pivot pins on linkage rods 23, 24 and the support arm 25 and remove all parts of the linkage assembly, except the rear power leg. Thus the linkage rods, front legs 20 and upper support arm 25 as well as the front supporting wheels attached to the front legs 20 can be stored conveniently beneath the rear section 14 of the camper unit within the bumper frame. For this purpose, as shown in FIG. 5, storage brackets 64 are mounted on the underside of the rear section of the camper to receive the disassembled parts of the linkage assembly; and the parts are snugly retained within the brackets when the tire carrier 56 is raised into the horizontal position.

In use, when the linkage parts are assembled on the camper unit and the assembly is in the horizontal retracted position shown in full in FIG. 3, the hydraulic control valve 48 may be actuated by the control handle 50 to force fluid under pressure through the rear pressure lines 49 into each of the hydraulic cylinders 44 thereby forcing the cylinder rods 45 outwardly and causing the rear power legs to pivot downwardly toward the extended vertical position shown in FIG. 4. Movement of the rear power legs is transmitted to the front legs through the linkage rods 24, and accordingly the entire camper unit is uniformly lifted to the maximum lift position, for example, as shown in FIG. 2. The pickup truck T may be backed beneath the camper unit with the center portion of the camper unit C aligned with the truck bed whereupon the unit C may be lowered onto the camper bed by reversing hydraulic fluid pressure to each of the cylinders 44 until the unit is fully supported on the truck bed. Further actuation of the control valve will cause the linkage assemblies to be raised into the horizontal retracted position. If desired, the linkage rods and front leg assemblies may be disassembled and stored beneath the rear section of the camper as described, or the linkage assemblies may be left installed on the camper unit without interfering with the normal use of the camper.

An alternate form of lift apparatus 10' is illustrated in FIGS. 7 to 11 wherein the linkage assembly is the same as that shown in the preferred form of FIGS. 1 to 6 but a modified form of drive mechanism is employed in place of the hydraulic drive mechanism described. Here, a threaded drive shaft 70 is journaled for rotation beneath the rear section of the camper unit within the bumper frame and is suspended from one end by a hanger bracket 71 having a retainer bolt 72 threadedly connected thereto and provided with a smooth bearing portion 73 projecting for insertion in a counterbore at the end of the drive shaft 70. The opposite, rearward end of the shaft is similarly supported for rotation within the opening formed in a reinforcing angle 74 affixed to the inner surface of the bumper frame. An external end 75 of the drive shaft is squared for engagement by a crank handle 76 for manual rotation of the drive shaft. In order to advance one of the rear power legs for movement between the retracted and extended positions, a rectangular drive nut 77 threadedly engages the drive shaft 70 for axial advancement along the shaft in response to rotation of the drive screw, and the drive nut is retained against rotation by firmly bearing against the undersurface of the camper unit. A follower arm 78 has a bifurcated end 79 which is pivotally connected to opposite sides of the drive nut and the follower arm extends downwardly for insertion through the slot 42 and pivotal connection of the lower end to the midportion of the power leg.

A driven sprocket 80 is mounted between a pair of thrust bearings 81 and 82 on the rearward end of the drive shaft, the sprocket 80 being aligned with a drive sprocket 84 on the end of the drive shaft 85 from drive motor 86. A power transmission chain 88 is trained over the sprockets 80 and 84 and over an idler sprocket 89 and another sprocket 80' at the rearward end of a second drive shaft 70' on the other rear power leg so that the power legs are simultaneously driven by the drive motor to synchronously advance the linkage assemblies on opposite sides of the camper unit between the retracted and extended positions. Alternately, the crank 76 can be used in place of the drive motor so as to simultaneously lift and lower the linkage assemblies and camper unit. It will be evident that the linkage assembly is operated in the same manner by the drive crank or drive motor to selectively lift and lower the camper unit in the manner described with reference to the preferred form of apparatus shown in FIGS. 1 to 6.

While the foregoing preferred and alternate forms of the present invention have been described with reference to a specific camper unit it will be apparent that the apparatus is readily conformable for use with other types of camper units simply by modification of the specific manner of pivotal interconnection of the font and rear legs to opposite sides of the camper body. In this relation, the essential structure is that of the front and rear spaced legs pivotally connected at their upper ends to opposite sides of the camper unit together with a lower linkage rod to unify movement of the legs and with a drive mechanism engageable either with the front or rear legs to impart the desired movement to the camper unit. In this relation, it may be desirable in selected applications to sequentially lift or lower the linkage assemblies on each side of the camper unit independently of one another, for example, by sequential activation of the drive mechanism for each rear power leg in the preferred form. In this way, the camper unit can be lifted or lowered one side at a time either in incremental steps or in a single step for each side over the entire distance. Of course the linkage assemblies would not be interconnected, as shown in the preferred form, so as to be free to work independently of one another.

While preferred and alternate forms of the present invention have been described herein, it is to be understood that the present disclosure has been made only by way of example and that changes in details of structure and materials may be made without departing from the spirit thereof.

What I claim is:

1. Lift apparatus for lifting and lowering a load to be lifted onto and from the bed of a vehicle wherein the load has a body provided with raised lateral wing surfaces on opposite sides thereof that are raised relative to the rear portion of the body and are adapted to overhang the sides of the vehicle, said apparatus comprising in combination:

a parallelogram linkage assembly secured to opposite sides of the load, each linkage having front and rear leg members pivotally secured at their upper ends to the load, and a pivotal connecting link pivotally interconnecting the lower ends of said front and rear leg members on each side of the load, actuating means engageable with a pivotal portion of at least one of said linkage assemblies to advance said linkage assemblies between a substantially horizontal, retracted position in which the load is relatively near the ground surface and a substantially vertical extended position in which the load is in a raised position relatively away from the ground surface for disposition on the platform, and front and rear ground-engaging wheels with the front wheels mounted on said linkage assemblies, each of said linkage assemblies being further movable to a first retracted position in which the load is supported on the ground by said linkage assemblies and a second retracted position in which said ground-engaging wheels support the load on the ground.

2. Apparatus according to claim 1 in which said actuating means is further characterized by being engageable with said rear member and operative to simultaneously advance said front and rear legs on each linkage between the substantially horizontal and vertical positions.

3. Apparatus according to claim 1 in which said actuating means comprises a rotatable drive shaft, a follower arm pivotally connected at one end to a rear leg of one of said linkage assemblies and the opposite end being engageable with said drive shaft to move axially in opposite directions along said drive shaft in response to rotation of said shaft, drive means for reversibly rotating one of said drive shafts and a power transmission system imparting rotation of the one drive shaft to the other of said drive shafts for synchronous rotation of said drive shafts and simultaneous movement of each of said linkage assemblies between the substantially horizontal and vertical positions.

4. Apparatus according to claim 1, further including ground-engaging wheels associated with said linkage assemblies, each of said linkage assemblies being further movable to a retraced position in which said wheels support said load on the ground.

5. Apparatus according to claim 1, said actuating means being defined by a hydraulic cylinder including a cylinder rod engageable with one of the pivotal elements on at least one of said linkage assemblies, and drive means being selectively energized to control extension and retraction of said cylinder rod relative to said cylinder for movement of said linkage assemblies between the substantially horizontal and vertical positions.

6. Apparatus according to claim 5, there being a hydraulic cylinder including a cylinder rod engageable with said rear leg member on each of said linkage assemblies, a source of hydraulic fluid pressure, and pressure, and valve means being selectively movable to control extension and retraction of said cylinder rods relative to their respective hydraulic cylinders for synchronous extension and retraction of said linkage assemblies between the substantially vertical and horizontal positions.

7. Lift apparatus for lifting and lowering a camper onto and from the bed of a vehicle wherein the camper unit includes a body provided with raised lateral wing surfaces on opposite sides thereof that are raised relative to the rear portion of the body and adapted to overhang the sides of the vehicle, said apparatus comprising in combination:

linkage assemblies on opposite sides of said camper body, each linkage assembly including front and rear leg members, means including linkage members interconnecting the upper ends of said front and rear leg members, front extension arms extending between said linkage members and the raised lateral wing surfaces of the body, and linkage rods pivotally interconnecting the lower ends of the front and rear leg members of each linkage assembly, and a drive mechanism engageable with one of the leg members on each of said linkage assemblies including drive means being selectively energized to synchronously advance said linkage assemblies between a substantially horizontal, retracted position in which the camper is supported on the ground surface and a substantially vertical, extended position in which the camper is raised a distance sufficient to permit its placement upon the bed of the vehicle.

8. Lift apparatus according to claim 7, said drive mechanism being engageable with the rear leg member on each of said linkage assemblies, said front extension arms being releasably connected at opposite ends to the upper ends of said front leg members and the raised lateral wing surfaces of the body, and means rigidly interconnecting said rear leg members for synchronous advancement of said linkage assemblies in response to activation of said drive mechanism.

9. Lift apparatus according to claim 7, further including means rigidly interconnecting upper and lower ends of said rear leg members, and a carrier bracket extending between said means for releasable attachment of a tire thereon.

10. Lift apparatus according to claim 7, said front leg members being releasably attachable to said camper and said linkage rods being releasably attachable to said front and rear leg members on each of said linkage assemblies.

11. Lift apparatus for lifting and lowering a camper onto and from the raised bed of a motor vehicle wherein the camper is provided with raised lateral wing surfaces on opposite sides thereof sized to overhang the aides of the vehicle and a rear end section sized to extend beyond the bed of the vehicle and having a skirt about the lower end thereof forming a rearward continuation of the lower edge of said vehicle, said lift apparatus comprising:

a linkage assembly on each side of said camper including spaced front and rear leg members, a front support assembly pivotally interconnecting each front leg member to the front lateral wing surface adjacent to the front end of said camper and a rear support assembly pivotally connecting the upper end of each rear leg member to the undersurface of the rear end section of said camper, an upper linkage rod extending between the upper ends of each of said front and rear leg members and a lower linkage rod pivotally interconnecting the lower ends of each of said front and rear leg members, and a drive mechanism mounted on the undersurface of the rear end section of said camper including drive arms engageable with said rear leg members and being operative to advance said rear leg members between a substantially horizontal retracted position along the undersurface of the rear end section of said camper and a substantially vertical, extended position, said linkage assemblies following movement of said rear leg members in response to extension and retraction thereof for movement between a lowered position in which the camper is supported by said linkage assemblies on the ground surfaces and a raised position in which the camper is supported on the bed of the vehicle.

12. Lift apparatus according to claim 11, further including a front ground-engaging wheel having a wheel support pivotally interconnected between the upper end of each front leg member and the lower end of each front leg member and at least one rear ground-engaging wheel including means for mounting said wheel on the undersurface of the rear end section of said camper.

13. Lift apparatus according to claim 11, said drive mechanism comprising a hydraulic cylinder assembly drivingly engaging each of said rear leg members, and hydraulic fluid pressure supply means being selectively energized to actuate said hydraulic cylinder assemblies for extension and retraction of said linkage assemblies.

14. Lift apparatus according to claim 12, said drive mechanism being operative to advance said linkage assemblies to a first lowered position in which said camper is supported on the ground surface by said linkage assemblies and a second lowered position in which said camper is supported on the ground surface by said ground-engaging wheels.